(12) United States Patent
Shields et al.

(10) Patent No.: US 10,434,438 B2
(45) Date of Patent: Oct. 8, 2019

(54) FLUID CONTACT TRAY PARTICULARLY FOR THE USE IN AN OFFSHORE FRACTIONATION COLUMN

(71) Applicant: Sulzer Chemtech AG, Winterthur (CH)

(72) Inventors: Stephen Shields, Winterthur (CH); Senthil Krishnamoorthy, Jenks, OK (US); Markus Duss, Winterthur (CH)

(73) Assignee: Sulzer Chemtech AG, Winterthur (CH)

( * ) Notice: Subject to any disclaimer, the term of this patent is extended or adjusted under 35 U.S.C. 154(b) by 132 days.

(21) Appl. No.: 15/537,811

(22) PCT Filed: Aug. 17, 2015

(86) PCT No.: PCT/EP2015/068863
§ 371 (c)(1),
(2) Date: Jun. 19, 2017

(87) PCT Pub. No.: WO2016/102082
PCT Pub. Date: Jun. 30, 2016

(65) Prior Publication Data
US 2017/0348609 A1 Dec. 7, 2017

(30) Foreign Application Priority Data
Dec. 23, 2014 (EP) .................................... 14200178

(51) Int. Cl.
*B01D 3/24* (2006.01)
*B01D 3/22* (2006.01)
(Continued)

(52) U.S. Cl.
CPC ............. *B01D 3/24* (2013.01); *B01D 1/0005* (2013.01); *B01D 3/20* (2013.01); *B01D 3/22* (2013.01);
(Continued)

(58) Field of Classification Search
CPC ... B01D 3/18; B01D 3/22; B01D 3/24; B01D 3/30; B01D 3/324; B01D 3/225
See application file for complete search history.

(56) References Cited

U.S. PATENT DOCUMENTS

| 1,513,354 A | 10/1924 | Wadsworth |
| 1,950,313 A | 3/1934 | Linde |

(Continued)

FOREIGN PATENT DOCUMENTS

| CN | 1695768 A | 11/2005 |
| CN | 103260717 A | 8/2013 |

(Continued)

OTHER PUBLICATIONS

International Preliminary Report on Patentability dated Jul. 6, 2017 from corresponding PCT Application No. PCT/EP2015/068863.

(Continued)

*Primary Examiner* — Renee Robinson
(74) *Attorney, Agent, or Firm* — Larson & Anderson, LLC (57) ABSTRACT

A fluid contact tray (10) for a fractionation column (1), in particular a vapor-liquid contact tray suitable for the use in an offshore fractionation column, comprises: •a tray deck (12) comprising an active mass transfer surface (20) suitable for contacting two fluids (l, g) of different densities, wherein the active mass transfer surface (20) comprises one or more orifices (18) for the passage of a fluid/gas (g), and wherein at least two at least partially radially extending separation walls (22-1, 22-2, 22-3, 22-4) and/or at least one separation weir (42) are arranged on the active mass transfer surface (20), which divides the active mass transfer surface (20) into at least two sections (24-1, 24-2, 24-3, 24-4), •an annular channel (26) suitable for collecting fluids/liquids (l), which is arranged at the peripheral area of the active mass transfer surface (20) and at least partially embraces the mass transfer (Continued)

surface (20), •a central downcomer (34) for collecting and discharging a fluid/liquid (l) from the annular channel (26), wherein the central downcomer (34) has the form of a hollow body with an opening (36) in the bottom section thereof being suitable for the distribution of liquid vertically downwardly, and wherein the central downcomer (34) is non-rotatably fixed at the fluid contact tray (10), and •at least one conducting means (40) for transferring fluid collected in the annular channel (26) from the annular channel (26) to the central downcomer (34). This fluid contact tray (10) is in particular useable for offshore applications, such as for a fractionation column located on a FLNG or FPSO vessel.

15 Claims, 7 Drawing Sheets (51) Int. Cl.
    *B01D 3/30*     (2006.01)
    *B01D 3/32*     (2006.01)
    *B01D 1/00*     (2006.01)
    *B01D 3/20*     (2006.01)

(52) U.S. Cl.
    CPC ............... *B01D 3/225* (2013.01); *B01D 3/30* (2013.01); *B01D 3/324* (2013.01)

(56) References Cited

U.S. PATENT DOCUMENTS

| | | |
|---|---|---|
| 2,457,667 A | 12/1948 | Harmon |
| 3,022,054 A | 2/1962 | Kotzebue |
| 3,105,105 A * | 9/1963 | Kittel ............... B01D 3/22 |
| | | 261/114.1 |
| 4,129,626 A * | 12/1978 | Mellbom ............... B01D 3/22 |
| | | 261/114.1 |
| 4,328,177 A | 5/1982 | Trager |
| 4,361,469 A | 11/1982 | Trutna |
| 4,582,569 A | 4/1986 | Jenkins |
| 5,798,086 A | 8/1998 | Erickson |
| 5,951,827 A | 9/1999 | Breedon |
| 6,095,504 A | 8/2000 | Heldwein et al. |
| 7,028,995 B2 * | 4/2006 | Weiland ............... B01D 3/20 |
| | | 261/114.1 |
| 7,370,846 B2 | 5/2008 | Xu et al. |
| 8,500,105 B2 | 8/2013 | Nieuwoudt |
| 8,833,742 B2 | 9/2014 | Xu et al. |
| 9,120,064 B2 | 9/2015 | Horoun et al. |
| 9,592,468 B2 | 3/2017 | Haroun et al. |
| 2004/0020238 A1 | 2/2004 | Kalbassi et al. |
| 2009/0256270 A1 | 10/2009 | Griepsma |
| 2010/0245236 A1 | 9/2010 | Paradowski et al. |
| 2012/0175792 A1 | 7/2012 | Nieuwoudt |
| 2013/0113128 A1 | 5/2013 | Alzner et al. |
| 2013/0277868 A1 | 10/2013 | Haroun et al. |
| 2013/0277869 A1 | 10/2013 | Haroun et al. |

FOREIGN PATENT DOCUMENTS

| | | |
|---|---|---|
| CN | 103372326 A | 10/2013 |
| CN | 103372366 A | 10/2013 |
| CN | 103732315 A | 4/2014 |
| EP | 1 723 995 B1 | 5/2013 |
| EP | 2 653 203 A1 | 10/2013 |
| EP | 2 653 204 A1 | 10/2013 |
| GB | 1 407 270 A | 9/1975 |
| JP | S39-002227 B | 5/1962 |
| JP | S41-009288 B | 12/1962 |
| JP | S5180681 A | 7/1976 |
| JP | S54-107473 A | 8/1979 |
| JP | 2005-534477 A | 11/2005 |
| JP | 2012-521537 A | 9/2012 |
| WO | 2004/011119 A2 | 2/2004 |
| WO | 2005/061070 A1 | 7/2005 |

OTHER PUBLICATIONS

Extended European Search Report dated Jun. 10, 2015 from corresponding European Patent Application No. 14200178.3-1351.

* cited by examiner

FLUID CONTACT TRAY PARTICULARLY FOR THE USE IN AN OFFSHORE FRACTIONATION COLUMN

CROSS REFERENCE TO RELATED APPLICATIONS

Not Applicable.

STATEMENT REGARDING FEDERALLY SPONSORED RESEARCH OR DEVELOPMENT

Not Applicable.

THE NAMES OF THE PARTIES TO A JOINT RESEARCH OR DEVELOPMENT

Not Applicable.

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable.

STATEMENT REGARDING PRIOR DISCLOSURES BY THE INVENTOR OR A JOINT INVENTOR

Not Applicable.

BACKGROUND OF THE INVENTION

Field of Invention

The present invention relates to a fluid contact tray for a fractionating column, in particular to a vapor-liquid contact tray suitable for the use in an offshore fractionation column, to a fractionation column comprising such fluid contact trays and to the use of such a fractionation column for a thermal separation process, in particular for an offshore application on non-stationary, floating objects.

Fractionation columns, such as distillation columns, absorption columns, extraction columns or the like, typically contain internal means for providing the surface area for the contact between the different components, which flow during the operation of the fractionation column usually in a counter-current direction through the fractionation column. A plurality of different kinds of internal means is known for this purpose, such as random packings, structured packings and contact trays.

Contact trays, which are often used for distillation and rectification columns, are arranged throughout the height of the column in spaced apart relation, wherein the trays typically comprise a tray deck, in which orifices are disposed, and one or more downcomers. In most cases, the trays are arranged in the fractionation column so that descending liquid is directed across each tray and from tray to tray in a zigzag manner, known as cross-flow trays, over the height of the column via the downcomers, whereas ascending vapor passes through the orifices so that a mass transfer and/or heat transfer is effected between the liquid and vapor. Often, deflectors (valves) are located above each orifice in the tray deck, in order to prevent that the liquid flows down the column through the orifices. In particular in large columns with a high liquid rate, multiple downcomers are used. In alternative column designs, the trays are configured as circular dual flow trays so that vapor and liquid compete for travel through the orifices in each direction.

In difference to contact tray, structured packings are composed of a plurality of corrugated metal plates, which are configured and arranged so that fluid is forced to take a regular path through the column, as a consequence of which a large surface area is generated for the contact between the liquid and the other phase, such as e.g. vapor. Often, the corrugated metal plates are perforated, in order to modify the wetting properties and flow characteristics of the packing. The surface area of the packing is typically adjusted in dependency of application wherein in tendency a lower specific surface area leads to a higher capacity of the packing, whereas a higher specific surface area increases to heat and mass transfer and thus the separation efficiency of the packing per height unit.

In contrast to this, random packings are composed of randomly oriented small bodies, which may have for example the form of spheres, rings or more complex geometries.

In most of the applications, fractionation columns are located stationary, i.e. onshore. However, recently offshore applications for fractionation columns get more and more interesting, such as fractionation on non-stationary platforms, on floating liquefied natural gas (FLNG) vessels, on floating production storage and offloading (FPSO) vessels or other non-stationary, floating objects. More specifically, the FLNG method aims to liquefy natural gas already on the sea close to the site of natural gas gathering, namely in particular on a specifically designed ship, and then to transport the liquefied natural gas with transport ships to the mainland, instead of—as traditionally—conveying gathered natural gas by means of a pipeline to the mainland. In this procedure, heavy hydrocarbons as well as contaminants, such as carbon dioxide and water, have to be removed from the crude natural gas, before the purified fraction comprising the light hydrocarbons is liquefied. Similar to that, FPSO is a floating vessel used for the offshore gathering, processing, in particular fractionation, storage and shipment of crude oil.

However, offshore fractionation is a challenging task, because the respective fractionation column is not located on the mainland, but on a non-stationary platform or on a ship, which is during its use not stationary, but subjected to motion as consequence of waves, wind and the like. Since typical contact trays comprising fractionation columns are very sensitive against motion and in particular against inclination leading to a maldistribution of particularly the liquid phase on the tray deck and thus to a low separation efficiency of the fractionation column, usually fractionation columns filled with packings are used for offshore application. However, for high pressure distillation applications, such as for fractionation columns for hydrocarbons operated at pressures of at least 6 bars, columns with packing need to be designed far from their hydraulic limits, which leads to large column diameters and highly packed columns. However, the efficiency of such packed fractionation columns is low, even if it allows a safe operation under non-stationary conditions.

Maldistribution is known as a phenomenon typical for fractionation columns that generally leads to a lower separation efficiency. It is due to non-uniform distribution of vapor flow rate and/or liquid flow rate over the cross section of the column. This leads to a non-uniform distribution of vapor to liquid ratio. However, best separation efficiency requires vapor and liquid to be contacted at a uniform ratio over the cross section of the column. Fractionation columns on non-stationary, floating objects can be out of ideal, vertical orientation due to various factors. First of all, uneven distribution of storage may lead to a constant tilt or static inclination of the object. Moreover, see and wind conditions—probably in combination with sloshing of stored liquid good—may lead to regular or irregular motion of the floating object. This motion leads to very non-ideal conditions for the fractionation column due to acceleration and out-of-verticality (dynamic inclination) and subsequent maldistribution effects.

In view of this it is an object of the present invention to provide a fluid contact tray for a fractionation column and in particular a vapor-liquid contact tray for a fractionation column, on which during its operation the phases and in particular the liquid phase are uniformly distributed even in case of motion, such as dynamic inclination, i.e. inclination with an irregularly changing angle, so that the fluid contact is perfectly well suited to be used in an offshore fractionation column having a separation efficiency maintained even in case of motion.

Description of Related Art

Not Applicable

BRIEF SUMMARY OF THE INVENTION

In accordance with the present invention, this object is satisfied by providing a fluid contact tray according to claim 1, i.e. by providing a fluid contact tray for a fractionating column, in particular a vapor-liquid contact tray suitable for the use in an offshore fractionation column, wherein the tray comprises:
 a tray deck comprising an active mass transfer surface suitable for contacting two fluids of different densities, wherein the active mass transfer surface comprises one or more orifices for the passage of a fluid, and wherein at least two at least partially radially extending separation walls and/or at least one separation weir are arranged on the active mass transfer surface, which divides the active mass transfer surface into at least two sections,
 an annular channel having a bottom area suitable for collecting fluids, which is arranged at the peripheral area of the active mass transfer surface and at least partially embraces the mass transfer surface,
 a central downcomer for collecting and discharging a fluid from the annular channel, wherein the central downcomer has the form of a hollow body with an opening in the bottom section thereof being suitable for the distribution of liquid vertically downwardly, and wherein the central downcomer is preferably non-rotatably fixed at the fluid contact tray, and
 at least one conducting means for transferring fluid collected in the annular channel from the annular channel to the central downcomer.

This solution bases on the surprising finding that by providing at least two at least partially radially extending separation walls and/or at least one separation weir being arranged on the active mass transfer surface and dividing the active mass transfer surface into at least two sections, by providing an annular channel having a bottom area suitable for collecting fluids, which is arranged at the peripheral area of the active mass transfer surface and at least partially embrace the mass transfer surface, by providing a central downcomer in the fluid contact tray for collecting and discharging a fluid from the annular channel, wherein the central downcomer has the form of a hollow body with an opening in the bottom section thereof being suitable for the distribution of liquid vertically downwardly, and wherein the central downcomer is preferably non-rotatably fixed at the fluid contact tray, and by providing at least one conducting means for transferring fluid collected in the annular channel from the annular channel to the central downcomer, a fluid contact tray for a fractionation column is obtained, on which during its operation the phases and in particular the liquid phase are at least more uniformly distributed even in case of motion, such as dynamic inclination, i.e. inclination with an irregularly changing angle, so that it is perfectly well suited to be used in an offshore fractionation column maintaining the separation efficiency even in case of motion. The central downcomer effects that the impact of motion to a fractionation column comprising the fluid contact tray is the same irrespective from the direction of motion. In addition, the central downcomer effects that the liquid is collected and mixed in single downcomer, which allows to even out any concentration gradients in the liquid transferred from the conducting means from the annular channel to the central downcomer. In addition, the form of the central downcomer, namely hollow body and preferably hollow cylinder, with an opening in the bottom section thereof allows to distribute liquid vertically downwardly onto the upper side of the tray deck of the adjacent fluid contact tray, which allows the liquid to uniformly distribute over the surface of the active mass transfer surface of the tray deck of the fluid contact tray even in the case of motion. Furthermore, the separation walls and/or separation weir(s) arranged on the active mass transfer surface of the tray deck divide(s) the active mass transfer surface of the tray deck into several sections, so that even in the case of an inclination of the fluid contact tray a collection of fluid on only a part of the tray deck leading to a significant reduction of separation efficiency as consequence of maldistribution is avoided. This is due to the fact that the liquid is forced by the separation wall(s) and/or separation weir(s) to flow in the respective sections of the tray deck and thus to cover the tray deck and active mass transfer surface at least substantially uniformly.

In addition, the combination of the provision of a central downcomer with an opening in the bottom section thereof, the provision of an annular channel having a bottom area suitable for collecting fluids, which is arranged at the peripheral area of the active mass transfer surface and at least partially embrace the mass transfer surface, and the provision of conducting means for transferring fluid collected in the annular channel from the annular channel to the central downcomer leads to a parallel flow in each fluid contact tray of the fractionation column, namely the liquid flows on the tray deck of each fluid contact tray from its center to its periphery (i.e. the liquid flows on the active mass transfer surface of each fluid contact tray from the radially inner end of the active mass transfer surface to its periphery) and then liquid is transferred from the annular channel of each fluid contact tray, i.e. of its periphery, to the central downcomer, i.e. to its center. This arrangement of liquid flow is commonly referred to as a parallel-flow tray as opposed to cross-flow trays. Parallel-flow leads to an improved separation efficiency compared to cross-flow (Lewis-case 2 versus Lewis-case 3). In contrast to the parallel-flow from the center to the periphery of the fluid contact tray in accordance with the present invention, a prior art tray called slit-tray type AM (trademark of the company Sulzer) is known with parallel flow in opposite direction. In this AM tray, the liquid flows directly into the central downcomer from where it is transferred via distribution arms to the periphery and released onto the active mass transfer surface of the adjacent fluid contact tray. Such an AM tray is much more sensitive against motion of the tray and in particular against any offset of the column axis from the vertical orientation.

Moreover, the provision of an annular channel having a bottom area suitable for collecting fluids being arranged at the peripheral area of the active mass transfer surface and at least partially embracing the mass transfer surface allows an efficient and complete disengagement of the liquid and vapor in the mixture flowing from the periphery of the active mass transfer surface into the annular channel so that substantially only liquid is transferred into the central downcomer.

All in all, the fluid contact tray for a fractionation column in accordance with the present invention is characterized by a significantly improved separation efficiency even and in particular in the case that the fractionation column is subjected to motion, such as inclination due to an offshore location, because it reliably avoids—even and in particular in the case that the fractionation column is subjected to motion—a maldistribution of vapor and liquid on the tray deck as well as a concentration deviations of the liquid transferred via the central downcomer from one tray to another.

On account of all this, the dimension of the fractionation column may be significantly reduced, namely by more than 35%, compared to a respective column including—instead of trays—a packing for obtaining the same separation efficiency at a given throughput of fluids. Consequently, the fluid contact tray for a fractionation column in accordance with the present invention is perfectly well suited to be used in an offshore fractionation column.

Central downcomer means in accordance with the present invention a downcomer which is arranged at least substantially concentrically about the longitudinal axis of the fractionation column comprising such trays, i.e. which is arranged at least substantially in the center of the tray deck.

Moreover, the active mass transfer surface is defined in accordance with the present invention as that part of the substantially horizontal surface of the tray deck allowing the contact of two fluids of different densities, namely of ascending vapor and of descending liquid, i.e. that part of the substantially horizontal surface of the tray deck comprising the orifices for the passage of a fluid. In other words, that part of the substantially horizontal surface of the tray deck not comprising orifices for the passage of a fluid are not part of the active mass transfer surface.

All numeric value ranges mentioned in the specification and in the claims are to be understood as approximate ranges. For example a specification of a diameter of 1.0 to 10.0 mm is to be understood as about 1.0 to 10.0 mm, wherein about means a deviation of at most 25%, preferably of at most 10% and more preferably of at most 5% of the mentioned numeric values.

In addition, the term "substantially" used in the specification and in the claims is to be understood to include the normal manufacturing tolerances of the respective parts. Thus, a substantially circular tray deck is a tray deck being circular under consideration of the typical manufacturing tolerances.

In accordance with a particularly preferred embodiment of the present invention, the tray deck including the active mass transfer surface of the fluid contact tray has, in top view, the form of a circle or at least substantially of a circle, wherein the active mass transfer surface of the fluid contact tray has, in top view, preferably the form of a circular ring or at least substantially of a circular ring, wherein the inner opening of the circular ring or the central portion of the tray deck, respectively, is covered by a compact plate without orifices. In other word, the tray deck has preferably a circular form, wherein the outer circular ring of the circle comprises orifices and is thus configured as active mass transfer surface, whereas the central portion preferably has no orifices at all or less orifices. However, it is also possible that the central portion has the same density of orifices as the outer circular ring of the circle. The central downcomer of a tray located in the fractionation column above the tray discussed here is located above the central, concentric portion of the circle. In this embodiment, the fluid contact tray is formed at least substantially symmetrically and preferably the tray deck comprising the active mass transfer surface and at least two at least partially radially extending separation walls and/or at least one separation weir is substantially rotation-symmetrically with respect to the axis, which extends through the center of the tray perpendicular to the tray deck, i.e. with respect to the longitudinal axis of the fractionation column comprising such trays. On account of this symmetry, the impact of motion is the same, independently from which direction the motion stems from.

The tray deck may have a diameter of between 1 and 10 m, preferably between 1 and 5 m and more preferably between 2 and 3 m.

As set out above, the design of the fluid contact tray in accordance with the present invention leads to a parallel flow in each fluid contact tray of the fractionation column, namely in operation liquid flows from the center of the tray deck over the radially inner end of the active mass transfer surface to the peripheral area of the active mass transfer surface, whereafter the liquid flows into the annular channel, where it is collected, before it is transferred from the annular channel at the peripheral area of the tray deck to the central downcomer located in the center of the fluid contact tray. Then, the liquid flows from the central downcomer via distribution opening(s) at its bottom onto the active mass transfer surface of the adjacent fluid contact tray. This liquid flow leads to a particular high separation efficiency even in the case of motion of the fractionation column comprising such trays.

In particular in the embodiment, in which the tray deck has a circular or at least substantially circular form, wherein the active mass transfer surface forms, in top view, the outer circular ring or at least substantially of a circular ring of the tray deck, the sum of open area provided by the orifices per unit area of the tray deck may vary and preferably at least substantially gradually vary from the radially inner end to the periphery of the active mass transfer surface of the tray deck. Thus, the open fraction sum of open area provided by the orifices per unit area of the tray deck may increase or decrease along the radial direction of the tray deck. Here, the open fraction is the quotient of the sum of open area provided by the orifices divided by the cross-section of the respective section of the tray deck. Valves, namely either fixed valves or float valves, may be located above each orifice in the tray deck, in order to prevent that the liquid flows down the column through the orifices.

It is proposed in a further development of the idea of the invention that the open fraction, i.e. the total area of the orifices, of the active mass transfer surface of the fluid contact tray is between 5 and 20%, preferably between 6 and 18% and more preferably between 8 and 13% based on the total area of the active active mass transfer surface of the tray deck.

As set out above, the separation walls arranged on the active mass transfer surface of the tray deck divide the active mass transfer surface of the tray deck into several sections, so that even in the case of inclination and acceleration of the fluid contact tray a collection of fluid on only a part of the tray deck leading to a significant reduction of separation efficiency as consequence of maldistribution is avoided, because the liquid is forced by the separation walls to flow in the respective sections of the tray deck and thus to cover the tray deck and active mass transfer surface at least substantially uniformly. Good results are in particular obtained, when the at least two at least partially radially extending separation walls extend substantially vertical.

While the separation walls may be unperforated, it is also possible that the separation walls are perforated. In the last mentioned case, the perforation may progressively change along the height or along the flow path.

The thickness of the separation walls depend on the material used and may be for example between 0.1 and 3 mm for a separation wall made of stainless steel. The tray deck itself has preferably a thickness between 1 mm and 6 mm and more preferably a thickness between 2 mm and 3 mm.

In tendency, the higher the (dynamic and static) inclination and the higher the acceleration, to which the tray is subjected during its operation, the higher the number of separation walls should be. Good results are in particular achieved, when between 2 and 8, more preferably between 2 and 6 and most preferably between 3 and 4 at least partially radially extending separation walls are arranged on the active mass transfer surface of the tray deck of the fluid contact tray.

It is preferred that all separation walls are arranged substantially equally spaced apart from each other on the active mass transfer surface, so that the active mass transfer surface is divided by the separation walls into substantially equally sized sections.

In case of motion the separation walls are more important at the peripheral end than in the center of the tray deck. Accordingly, it is suggested in a further development of the idea of the invention that the at least two at least partially radially extending separation walls extend from the radially outer peripheral line of the active mass transfer surface over at least 50% of the distance between the peripheral line of the active mass transfer surface and the center of the tray deck.

However, it is not necessary that the at least two separation walls extend in radial direction over the whole width (i.e. radial length) of the tray deck, so that it is possible that the at least two at least partially radially extending separation walls extend only up to 90% or even only up to 70% of the distance between the peripheral line of the active mass transfer surface and the center of the tray deck. This allows to save material and to reduce the weight of the fluid contact tray. Due to this, it is preferred that the at least two at least partially radially extending separation walls extend from the radially outer periphery line of the active mass transfer surface over more than 50% to less than 100%, preferably over 60 to 90% and more preferably over 60 to 75% of the distance between the peripheral line of the active mass transfer surface and the center of the tray deck.

However, it is alternatively also possible that the at least two separation walls extend in radial direction over the whole width (i.e. radial length) of the tray deck.

In a further preferred embodiment of the present invention, the at least two at least partially radially extending separation walls have a height, which corresponds to 50 to 90% of the height of the fluid contact tray and/or corresponds to 50 to 90% of the tray spacing. This allows to reliably and completely avoid that during motion of the column liquid flows from one section of the tray deck to another. The tray spacing is the clearance above one tray deck and below the adjacent tray deck located above. The tray spacing is preferably 100 mm to 1,000 mm, more preferably 250 mm to 800 mm and most preferably 400 mm to 700 mm.

Alternatively, i.e. instead of separation walls, or additionally, i.e. in addition to separation walls, at least one separation weir may be provided preferably at intermediate radius of the tray deck. In this embodiment preferably at least one azimuthal extending separation weir is provided at intermediate radius, wherein the at least one separation weir may be unperforated or perforated.

In particular, the at least one separation weir may have a circular shape.

It is possible that between 1 and 8, preferably between 2 and 6 and more preferably between 3 and 4 separation weirs and particularly preferred circular separation weirs are arranged on the active mass transfer surface.

Good results are in particular obtained, when the at least one at least partially radially extending separation weir extends substantially vertical.

The thickness of the at least one separation weir may be between 0.1 and 3 mm, particularly if it is made of stainless steel.

Moreover, it is preferred that the at least one separation weir has a height, which corresponds to 5 to 90% and more preferably 5 to 60% of the height of the fluid contact tray and/or corresponds to 5 to 60% and more preferably 10 to 40% of the tray spacing.

Preferably, at least one separation weir and more preferably 2 to 6 separation weirs are arranged at the radially outer end of the active mass transfer surface, i.e. directly radially upstream of the annular channel. The separation weir of this embodiment has preferably a height corresponding to 5 to 60% and preferably 10 to 40% of the tray spacing and works as outlet weir allowing liquid to be discharged into the annular channel only, if a certain liquid level corresponding to the weir height is exceeded. In order to fulfill this function, the at least one separation weir of this embodiment has a circular shape, wherein all separation weirs cover at least 50%, more preferably at least 70%, more preferably at least 80%, even more preferably at least 90% and most preferably all of the periphery of the active mass transfer surface.

Alternatively, such separation weir(s) are absent at the radially outer end of the active mass transfer surface so that the liquid is discharged into the annular channel over the edge at the radially outer end of the active mass transfer surface.

In accordance with a particularly preferred embodiment of the present invention, it is suggested that at least one at least partially radially extending partition wall is arranged on the bottom area and/or in the top area of the annular channel of the fluid contact tray. The partition wall extends at least over a part of the height of the annular channel. Even if it is preferred that the partition wall is connected with the bottom of the annular channel, this is not mandatory. Thus, a smaller or larger slit may be between the lower end of the partition wall and the bottom surface of the annular channel.

In this manner, likewise to the active mass transfer surface also the annular channel of the fluid contact tray is divided into two or more sections, so that during the motion of the tray deck also a maldistribution of the liquid in the annular channel is reliably avoided, because liquid cannot flow to one side of the annular channel due to the motion or due to the offset of the column axis from the vertical. The at least one partition wall may be produced from the same material, for example stainless steel, with the same thickness as the at least two separation walls. However, it may also be perforated or at least partially transmissible.

Moreover, the partition wall and the separation wall may be part of the same wall, i.e. one wall extending over the tray deck until the peripheral end of the active mass transfer surface and over the annular channel may form a separation wall as well as a partition wall. Even if in this case only one wall is arranged on the tray deck until the peripheral end of the active mass transfer surface, wherein the portion on the tray deck is the separation wall in the aforementioned sense and the portion extending through the annular channel is the partition wall in the aforementioned sense, subsequently nevertheless both parts of the wall are differently named, namely as separation wall and partition wall.

Preferably, the at least one at least partially radially extending partition wall extends substantially in vertical direction.

In tendency, the higher the (dynamic or static) inclination of the column and the higher the acceleration, to which the tray is subjected during its operation, the higher the number of partition walls preferably be. Good results are in particular achieved, when 1 and 8, more preferably between 2 and 6 and most preferably between 3 and 4 at least partially radially extending partition walls are arranged on the bottom area and/or in the top area of the annular channel.

As the influence of the separation walls arranged on the active mass transfer surface of the fluid contact tray concerning the separation efficiency of the tray is higher than the influence of the partition walls arranged on the bottom area and/or in the top area of the annular channel, because a segmentation of the active mass transfer surface of the fluid contact tray assures a uniform distribution of the liquid over the active mass transfer surface and thus an excellent contact of the liquid with the vapor even in the case of motion, the number of partition walls arranged on the bottom area and/or in the top area of the annular channel may be smaller than the number of the separation walls arranged on the active mass transfer surface. Thereby, material is saved and the weight of the tray is reduced. Moreover, because preferably each section of the annular channel is connected with a conducting means, this also reduces the number of required conducting means, which leads to a significant material saving and to a drastic weight reduction of the tray. Excellent contact of the liquid with the vapor means in this connection that vapor and liquid encounter each other in approximately uniform ratio, i.e. the ratio mass of liquid divided by mass of gas is identical all over the active mass transfer surface. This situation is more easily achieved with separation walls.

However, it is also possible that the number of partition walls arranged on the bottom area and/or in the top area of the annular channel is equal to the number of the separation walls arranged on the active mass transfer surface. However, due to the reasons set out above, it is not preferred that the number of partition walls arranged on the bottom area and/or in the top area of the annular channel is higher than the number of the separation walls arranged on the active mass transfer surface.

In the case that the fluid contact tray comprises two or more at least partially radially extending partition walls, it is preferred that all partition walls are arranged substantially equally spaced apart from each other on the bottom area and/or in the top area of the annular channel, so that the annular channel is divided by the partition walls into substantially equally sized sections.

In contrast to the at least two separation walls, which must not to extend over the whole radial length of the tray deck until the peripheral end of the active mass transfer surface of the fluid contact tray, it is preferred that the at least one partition wall extends radially over the whole width (i.e. radial length) of the annular channel. At least one partition wall may be partially perforated. This allows liquid levels to adjust if the column remains in a certain position for a longer period of time. Such perforation is especially advantageous for complete drainage of the column when operation is interrupted.

It is proposed in a further development of the idea of the invention that the bottom area of the annular channel is located, in the height axis of the tray, beneath the peripheral area of the active mass transfer surface and that the depth of the annular channel is preferably between 30 and 70% and more preferably between 40 and 60% of that of the fluid contact tray and/or that the depth of the annular channel is preferably between 30 and 70% and more preferably between 40 and 60% of the tray spacing. The depth of the annular channel means the distance between the lowermost point of the surface of the bottom area of the annular channel and the point of the peripheral line of the active mass transfer surface, which is perpendicular above the lowermost point of the surface of the bottom area of the annular channel.

There is no particular limitation for the width (i.e. radial length) of the annular channel. However, the width of the channel depends on the liquid loading and is preferably dimensioned in a way that the superficial downward velocity is not higher than a certain value, namely typically so that the superficial downward velocity is between 0.06 and 0.14 m/s. Good results are in particular obtained, when the width of the annular channel of the fluid contact tray according to the present invention is between 50 and 500 mm, more preferably between 100 and 400 mm and most preferably between 200 and 350 mm. The width of the annular channel is typically determined by the ratio of the weir load divided by the maximum superficial downcomer velocity.

Preferably, the at least one at least partially radially extending partition wall of the annular channel of the fluid contact tray has a height, which corresponds to 50 to 90% of the depth of the annular channel. Alternatively, it is also possible that the at least one at least partially radially extending partition wall of the annular channel of the fluid contact tray has a height so that its upper end is at the same height as the at least two separation walls. In the latter case, the at least one at least partially radially extending partition wall has a height, which corresponds to 50 to 90% of the height of the fluid contact tray. The aforementioned embodiments allow to reliably and at least partially avoid that during motion of the column liquid flows from one section of the annular channel to another and avoid that one section of the annular channel is emptied during operation.

In order that the annular channel has a sufficiently high volume to completely and reliably collect the fluids and in particular liquid flowing from the peripheral end of the active mass transfer surface of the tray deck into the annular channel, but is not too large to unnecessarily enlarge the fluid contact tray, it is suggested that the radial length of the annular channel is 5 to 40% and more preferably 10 to 30% of the radius of the fluid contact tray.

In principle, there is no particular limitation for the geometry of the annular channel as long as it is assured that the annular channel fulfils its function, namely to completely and reliably collect the fluids, allow the lower density phase to disengage from the higher density phase (degassing) and in particular liquid flowing from the peripheral end of the active mass transfer surface of the tray deck into the annular channel and to completely and reliably transfer the liquid to the conducting means. Good results are for example achieved, when the bottom area of the annular channel has, with respect to the height axis of the tray, substantially a v-form. Thereby, the bottom area of each section of the annular channel is sloped towards the middle of the respective section, so that, if at the middle of the respective section the conducting means opens out, all liquid can be completely transferred by the conducting means from the annular channel to the downcomer, even if the liquid level in the annular channel should be low.

This effects that the liquid can be completely withdrawn, if the opening of the conducting means is arranged so that liquid flows from the deepest point of the bottom area of the annular channel into the conducting means.

However, in order to have a less complex form and thus to save construction costs, it is even more preferred that the bottom area of the annular channel has, with respect to the height axis of the tray, a horizontally planar form. In this case, liquid can be collected and transferred reliably if the liquid level in the annular channel is maintained at a sufficient height even if the column is exposed to motion.

In accordance with a further particularly preferred embodiment of the present invention, it is suggested that the tray deck of the fluid contact tray is sloped downwardly, for example either from center of the tray deck to the periphery of the active mass transfer surface or from the radially inner end of the active mass transfer surface to the periphery of the active mass transfer surface, with a negative angle (measured in radial direction) with respect to the horizontal plane. This allows to mitigate the impact of motion on the liquid flow path and in particular of the liquid flow over the active mass transfer surface of the tray deck. The angle depends on the expected amplitude of the motion of the fluid contact tray during its operation. Good results are in particular achieved, when the negative angle of the tray deck with respect to the horizontal plane is between 2 and 10°, more preferably between 3 and 8° and most preferably between 4 and 7°, such as for example about 5°.

Figure 2A:
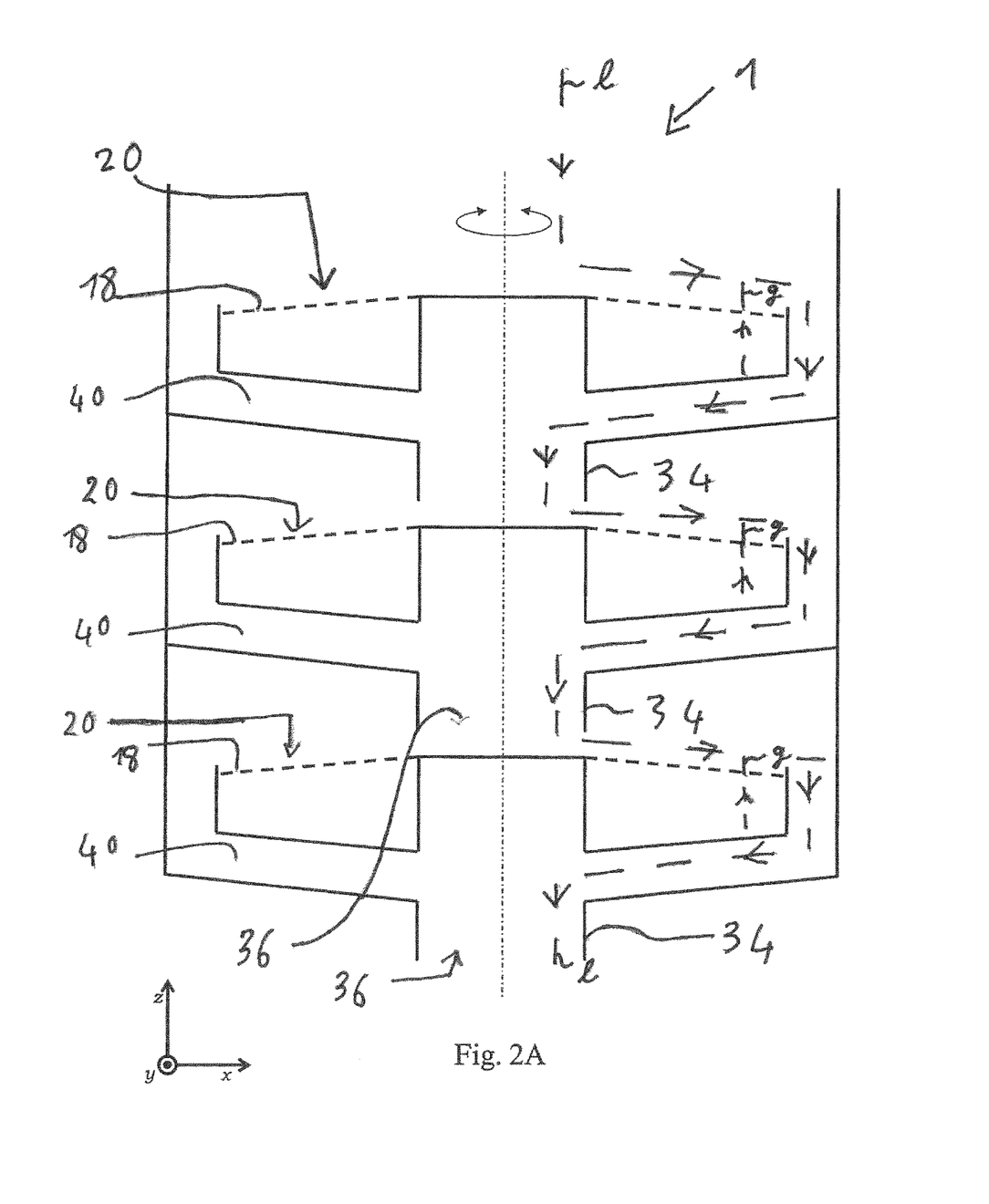
FIG. 2A is a sectional side view of a fractionation column comprising 3 fluid contact trays of the embodiment shown in FIGS. 1A to 1C.
Figure 2B:
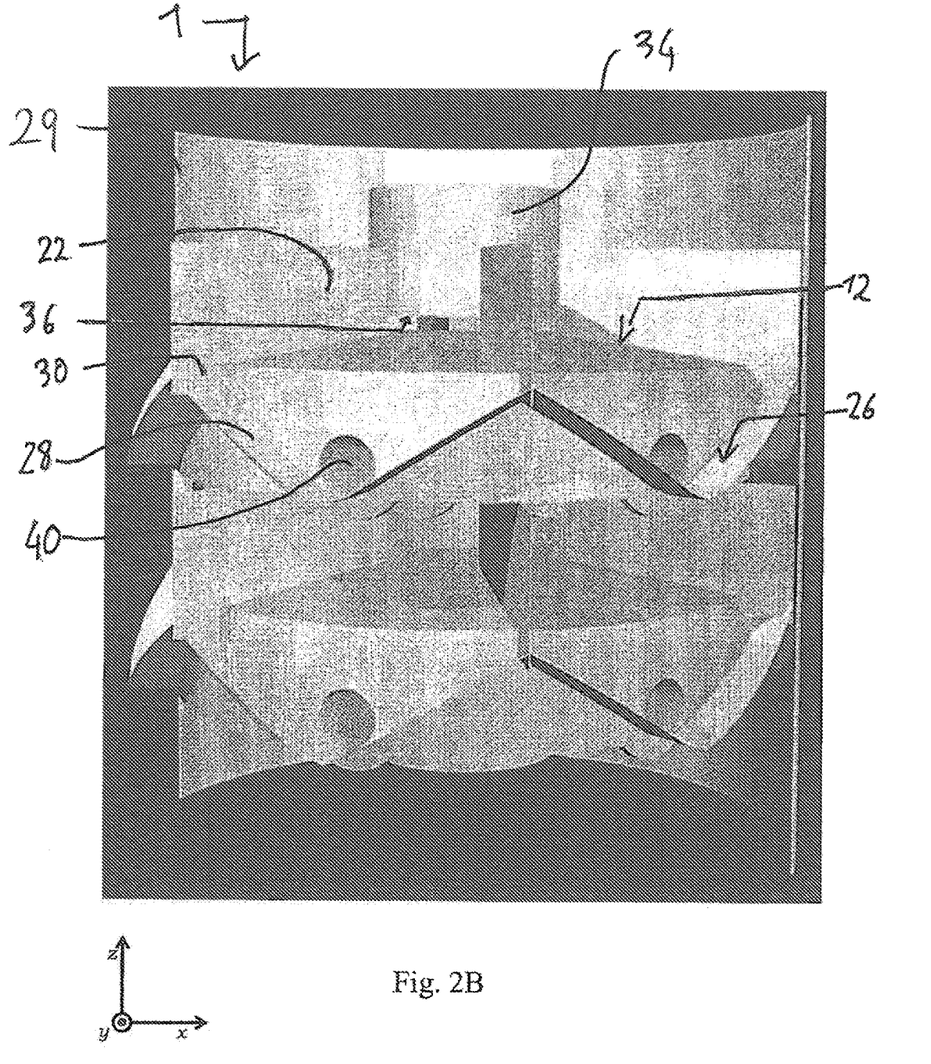
FIGS. 2B and 2C are schematic side views of the fractionation column shown in FIG. 2A.

In a preferred embodiment of the present invention, the bottom area of the annular channel has, seen in the height of the fluid contact tray, the form of a regular pattern comprising several v-forms adjacent to each other as shown in FIG. 2B below.

It is proposed in a further development of the idea of the invention that the at least one conducting means is a pipe, wherein one opening of the pipe opens out into the lower part of the annular channel and the other opening of the pipe opens out into the central downcomer. It is thereby assured that the liquid, which has been at least largely separated from residual vapor in the annular channel, in which a degassing is effected, and which is transferred in the pipe from the annular channel to the central downcomer is not contaminated during the transfer with ascending vapor. Preferably, the pipe opens out into the lowest part of the annular channel, in order to completely remove liquid the annular channel even in the case of a low liquid level in the annular channel. The diameter of the pipe may be between 10 and 200 mm, preferably between 15 and 100 mm and more preferably between 20 and 80 mm, such as about 50 mm.

Alternatively, the at least one conducting means may be a channel, such as a channel with a rectangular cross-section; which may be completely closed by respective walls except the top and the two openings, from which one opens out into the annular channel and the other opens out into the downcomer. However, this embodiment is less preferred, because it allows the contamination of the liquid transferred in the conducting means from the annular channel into the central downcomer gets contaminated with ascending vapor. Furthermore, resistance must be provided at the outlet of the annular channel in order to allow a certain liquid level in the annular channel without causing an overflow of the conducting means and in order to avoid vapor bypass through the annular channel.

It is preferred that the number of conducting means is the same or more as the number of sections of the annular channel, so that to each section of the annular channel at least a single conducting means is correlated. Accordingly, it is preferred that, when at least one at least partially radially extending partition wall is arranged on the bottom area of the annular channel dividing the annular channel in a number of sections corresponding to the number of the partition walls, the fluid contact tray comprises equal or a greater number of conducting means than the number of sections.

Particular good results are obtained, when each of the conducting means is a pipe, wherein one opening of each pipe opens out into a lower part of a different annular channel and the other opening of each pipe opens out into the central downcomer.

Moreover, it is preferred that the tray comprises between 1 and 8, more preferably between 2 and 6 and most preferably between 3 and 4 pipes as conducting means.

As the driving force for transferring the liquid in the conducting means from the annular channel to the central downcomer comes from the liquid level adjusted in the annular channel, it is not necessary that the conducting means is sloped from the annular channel to the downcomer. Accordingly, in accordance with one variant of the present invention, the at least one conducting means extends substantially horizontally from the annular channel to the central downcomer.

However, according to an alternative variant of the present invention the at least one conducting means may be sloped from its end opening out into the lower part of the annular channel to that end opening out into the central downcomer, such as with a negative angle with respect to the horizontal plane of 1 to 10° and preferably of 2 to 6°.

In accordance with the present invention, the central downcomer of the fluid contact tray has the form of a hollow body and preferably at least substantially the form of a hollow cylinder, wherein the central downcomer has one opening in a bottom section thereof, which is suitable for the distribution of liquid to a subsequent internal which is envisaged to be placed below the fluid contact tray, namely, when used in a fractionation column, to a subsequent fluid contact tray. More specifically, the opening in the bottom section of the central downcomer of the fluid contact tray allows to distribute liquid vertically downwardly onto the upper side of the tray deck of the adjacent fluid contact tray, which allows the liquid to uniformly distribute over the surface of the active mass transfer surface of the tray deck of the fluid contact tray even in the case of motion. In addition, the central downcomer is fixed at the fluid contact tray and preferably non-rotatably fixed at the fluid contact tray, such as fixed at the bottom side of the central portion of the tray deck.

The diameter of the central downcomer should be comparably small, so that the deviation of liquid level due to motion of the tray is also small and a mitigation of liquid maldistribution in the case of motion of the tray is achieved, as a consequence of which an even liquid flow of the liquid from the central downcomer onto the subsequent tray deck is achieved. In view of this, it is preferred that the diameter of the central downcomer is designed in such a way that superficial velocity of the descending clear liquid is lower than 0.5 m/s and preferably lower than 0.3 m/s. Therefore, the diameter of the central downcomer ranges from 5% to 40% and more preferably 10% to 30% of the diameter of the fluid contact tray.

Moreover, the height of the central downcomer may be 30 to 100% of tray spacing, i.e. the distance between adjacent receiving downcomers in the fractionation column. Preferably, the height of the downcomer is 50 to 100%, more preferably 75 to 100% and even more preferably 90 to 100% of the tray spacing.

In order to allow a degassing of the liquid in the central downcomer, i.e. to remove possible residual vapor included in the liquid, it is suggested in a further development of the idea of the invention that the central downcomer has at least one venting hole, which is preferably formed in an outer wall of the central downcomer and further preferably above the part of the central downcomer, in which the at least one conducting means opens out into the central downcomer. Instead, the hollow body forming the central downcomer may end at a certain distance below the next upper tray deck, thus allowing the gas to escape through the clearance above the body.

In addition, the present invention relates to a fractionation column comprising:
  a housing and
  at least one aforementioned fluid contact tray.

Preferably, the fractionation column comprises at least two fluid contact trays, which are arranged so as to allow the distribution of liquid vertically downwardly from the opening of the downcomer of one fluid contact tray onto the upper side of the tray deck of the adjacent fluid contact tray.

Preferably, the fractionation column comprises at least two aforementioned fluid contact trays, wherein the tray spacing between adjacent fluid contact trays is between 100 mm to 1,000 mm, preferably between 250 mm and 800 mm and preferably between 400 mm and 700 mm.

In accordance with another preferred embodiment of the present invention, the connecting pipes of all fluid contact trays of the fractionation column are each hollow pipes.

Another subject matter of the present invention is the use of an aforementioned fractionation column for a thermal separation process to separate fluid mixtures into their components, such as preferably by means of distillation, rectification, stripping, direct heat exchange, absorption or extraction.

Preferably, the fractionation column is located offshore and preferably on an offshore mobile platform or a ship, such as on a FLNG or FPSO vessel.

According to another preferred embodiment of the present invention, the use comprises at least one of:
  high pressure distillation in the fractionation column, which is preferably performed at a pressure of at least 6 bar.
  removal of a heavy fraction in the fractionation column from a hydrocarbon mixture, preferably from natural gas before liquefying one of the resulting fractions,
  removal of light fractions in the fractionation column from a hydrocarbon mixture, such as de-methanizing, de-ethanizing, de-propanizing and/or debutanizing.

Preferably, the fractionation column is operated so that liquid flows on the active mass transfer surface of each fluid contact tray from its radially inner end to its periphery and liquid is transferred from the annular channel of each fluid contact tray to the central downcomer.

It is proposed in a further development of the idea of the invention that during the operation of the fractionation column the flow velocity of the liquid in the conducting means of each fluid contact tray is at most 2.0 m/s and preferably between 0.2 and 2.0 m/s or between 0.5 and 1.0 m/s.

BRIEF DESCRIPTION OF THE DRAWING(S)

Specific embodiments in accordance with the present invention are now described with reference to the appended drawings and by an example.

DETAILED DESCRIPTION OF THE INVENTION

Figure 1A:
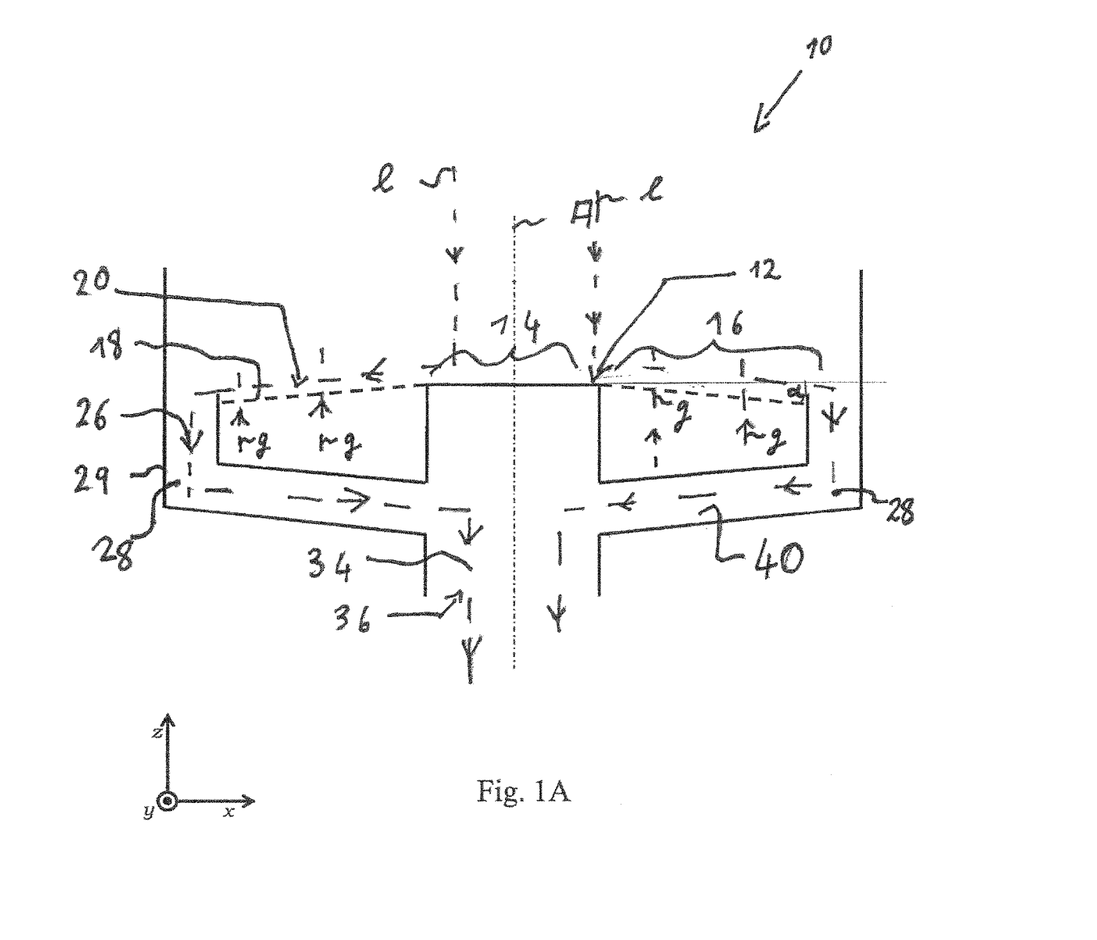
FIG. 1A is a sectional side view of a fluid contact tray according to one embodiment of the present invention.
Figure 1B:
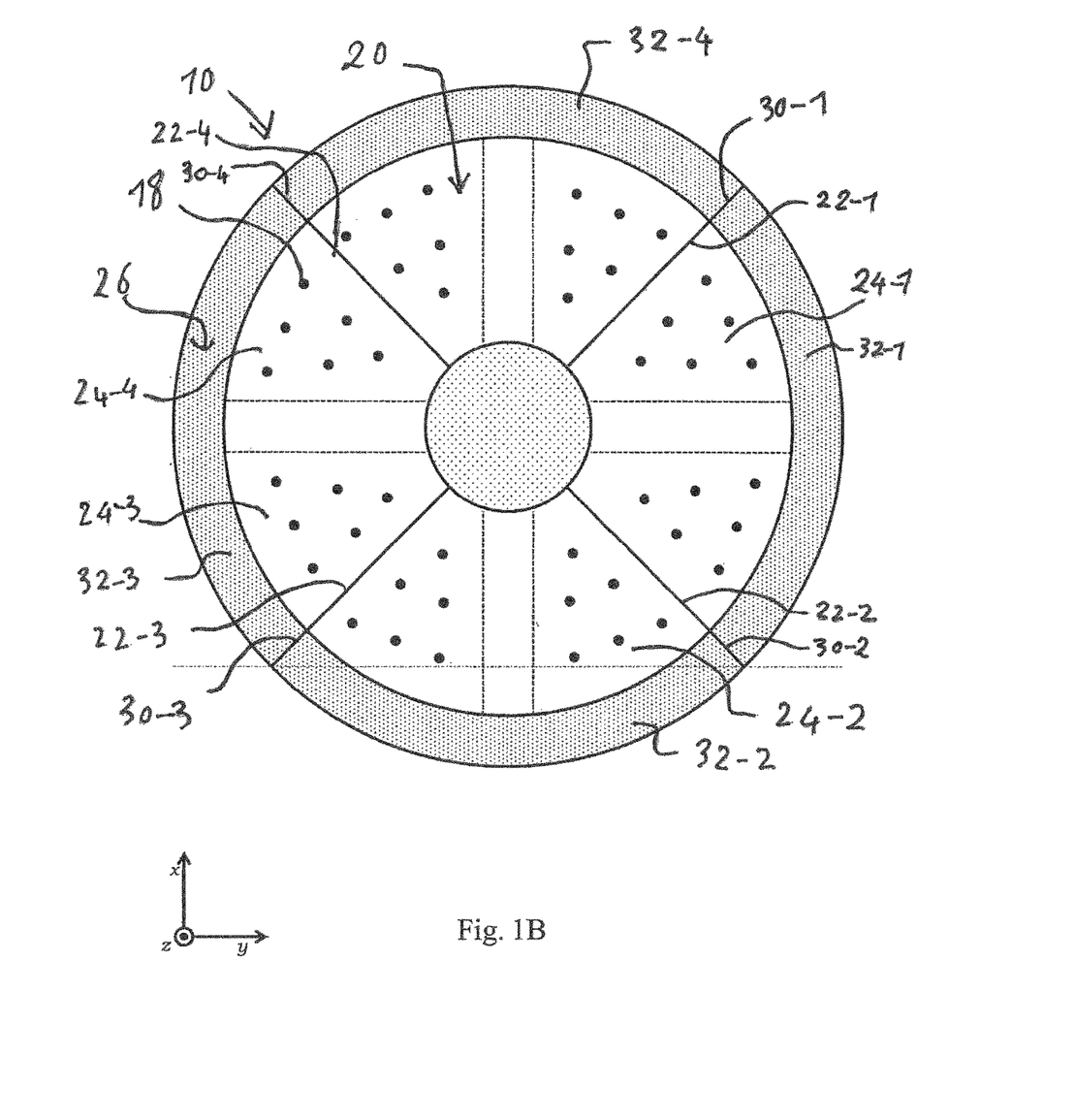
FIG. 1B is a sectional top view of the fluid contact tray of the embodiment shown in FIG. 1A.
Figure 1C:
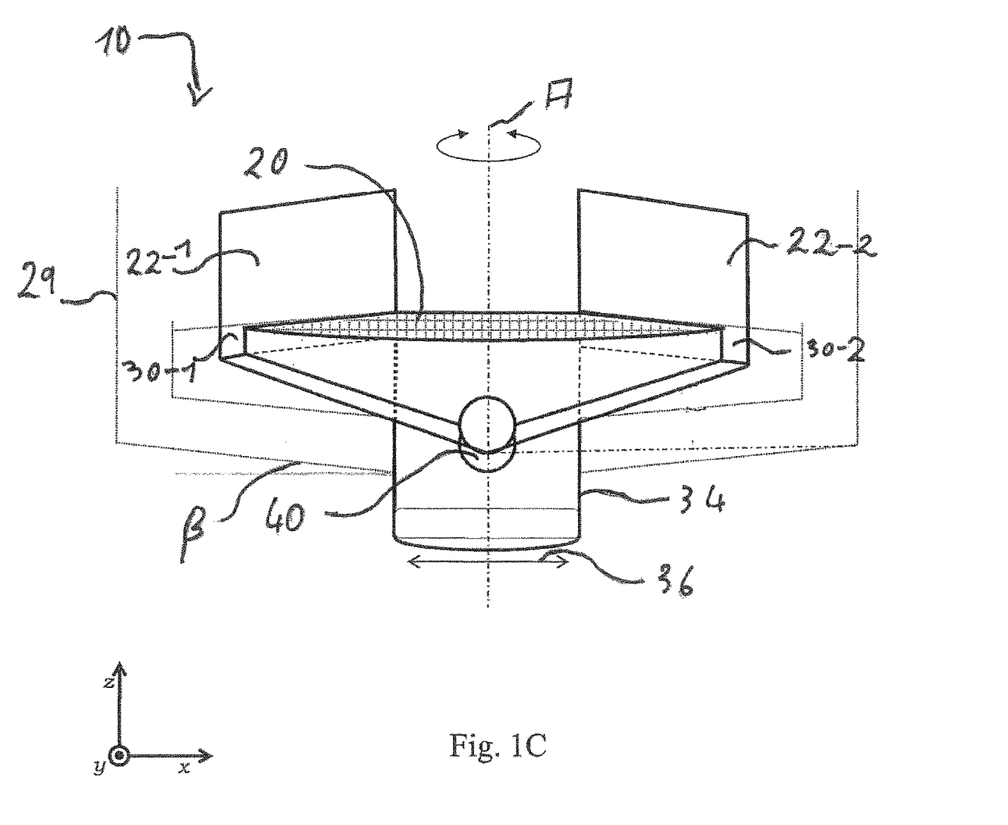
FIG. 1C is a schematic side view of the fluid contact tray of the embodiment shown in FIGS. 1A and 1B.

FIGS. 1A to 1C show a fluid contact tray 10 according to an embodiment of the present invention, which is in particular suitable to be used in a fractionation column used in an offshore application, such as in a fractionation column located on a FLNG or FPSO vessel.

The fluid contact tray 10 shown in FIGS. 1A to 1C has a circular shape in the horizontal plane or xy plane, respectively, and therefore is rotational-symmetrical with respect to the column axis A or height axis A, respectively.

The fluid contact tray 10 comprises a tray deck 12, which comprises a central portion 14 and a main portion 16, wherein the main portion 16 comprises one or more orifices 18, so that the surface of the main portion 16 having in top view the form of an outer circular ring is configured as active mass transfer surface 20, which is suitable for contacting two fluids of different densities, e.g. radially flowing liquid (l) and ascending gas g. Top view means the view onto the plane x, y. As best shown in FIG. 1A, the active mass transfer surface 20 is sloped from the radially inner end to the periphery of the active mass transfer surface 20 with a negative angle ($\alpha$) with respect to the horizontal plane of about 5°. The active mass transfer surface 20 is that part of the substantially horizontal surface of the tray deck 12 comprising the orifices 18 for the passage of fluid, i.e. excluding the central portion 14 of the tray deck 12 not comprising orifices 18.

As best shown in FIG. 1B, four radially extending separation walls 22-1, 22-2, 22-3, 22-4 are arranged on the active mass transfer surface 20, wherein the separation walls 22-1, 22-2, 22-3, 22-4 divide the active mass transfer surface 20 into four sections 24-1, 24-2, 24-3, 24-4. All separation walls 22-1, 22-2, 22-3, 22-4 are equally spaced apart from each other on the active mass transfer surface 20, so that the active mass transfer surface 20 is divided by the separation walls 22-1, 22-2, 22-3, 22-4 into equally sized active mass transfer surface sections 24-1, 24-2, 24-3, 24-4.

In addition to the tray deck 12, the fluid contact tray 10 comprises an annular channel 26 having a bottom area 28 suitable for collecting fluids, wherein the bottom area 28 is arranged at the periphery of the active mass transfer surface 20 and at least partially embraces the mass transfer surface 20. The annular channel 26 is margined on its peripheral end by a sidewall 29 which may be the wall of the column containing the tray. As best shown in FIG. 1B, the four radially extending separation walls 22-1, 22-2, 22-3, 22-4 extend also over the annular channel 26. Even if these are each one wall, in the present patent application their portion extending over the active mass transfer surface 20 is named separation wall 22 and the portion extending over the annular channel 26 is named partition wall 30. As best shown in FIG. 1B, the four partition walls 30-1, 30-2, 30-3, 30-4 are equally spaced apart from each other on the bottom area 28 of the annular channel 26, so that the annular channel 26 is divided by the partition walls 30-1, 30-2, 30-3, 30-4 into equally sized annular channel sections 32-1, 32-2, 32-3, 32-4. The bottom area 28 of the annular channel 26 is located, in the height axis A of the tray, beneath the peripheral area 16 of the active mass transfer surface 20. The depth of the annular channel 26 is about 45% of the tray spacing and the width (i.e. radial length) of the annular channel 26 is about 15% of the radius of the fluid contact tray 10. As best seen in FIG. 1C, the bottom area 28 of the annular channel 26 has, with respect to the height axis A of the tray, a v-form.

Moreover, the fluid contact tray 10 comprises a central downcomer 34 for collecting and discharging a fluid (l) from the annular channel 26. The central downcomer 34 is non-rotatably fixed at the bottom side of the central portion 14 of the tray deck 12 (or it may reside on the upper side of the central portion 14 of the tray below; not shown). It has the form of a hollow body, which is in the present case a hollow cylinder, wherein the central downcomer 34 has a discharge opening 36 in the bottom section thereof, which is suitable for the distribution of liquid vertically downwardly onto the upper side of the tray deck of the adjacent fluid contact tray. The diameter of the central downcomer 34 is comparably small compared to the diameter of the tray deck 12, so that the deviation of liquid level due to motion of the tray 10 is also small and a mitigation of liquid maldistribution in the case of motion of the tray 10 is achieved. This is due to the fact that if the diameter is small, the motion will lead to a relatively small deviation in liquid head above the discharge opening of the central downcomer. As a result, the driving force for liquid leaving the central downcomer does not vary much between two opposite sides of the downcomer. Therefore, almost the same amount of liquid will be discharged to the sections of the active mass transfer surface. As a consequence thereof an even liquid flow of the liquid from the central downcomer 34 onto the subsequent tray deck 12 is achieved. In order to allow a degassing of the liquid in the central downcomer 34, i.e. to remove possible residual vapor (g) included in the liquid (l), the central downcomer 34 has several venting holes 38, which are formed in the upper part of the outer wall of the central downcomer (not shown in FIGS. 1A to 1C, 2A and 2B, but in FIG. 2C). The diameter of the central downcomer 34 is designed in such a way that superficial velocity of the descending clear liquid is lower than 0.25 m/s. Therefore, the diameter of the central downcomer 34 ranges to about 20% of the diameter of the fluid contact tray.

Furthermore, the fluid contact tray 10 comprises four pipes 40 as conducting means 40 for transferring liquid (l) collected in the annular channel 26 from the annular channel 26 to the central downcomer 34. While one opening of the pipe 40 opens out into the lower part of the annular channel 26, the other opening of the pipe 40 opens out into the central downcomer 34. It is thereby assured that the liquid (l), which has been at least largely separated from residual vapor (g) in the annular channel 26 and which is transferred in the pipe 40 to the central downcomer 34 is not contaminated during the transfer with ascending vapor. As can best be seen in FIG. 1C, the pipe 40 opens out into the lowest part of the annular channel 26. In the shown embodiment, all pipes 40 are slightly sloped from their end opening out into the lower part of the annular channel 26 to the end opening out into the central downcomer 34, namely with a negative angle β with respect to the horizontal plane of about 5°.

During the operation, liquid (l) descends—as shown by the broken lines marked with (l) and arrows in FIGS. 1A and 2A—from the opening 36 in the bottom area of the central downcomer 34 of a tray 10 (not shown in FIGS. 1A to 1C, but in FIG. 2A) arranged above the tray 10 shown in FIG. 1A and hits the tray deck 12 on the surface of the central portion 14. Then, the liquid (l) flows over the active mass transfer surface 20 and comes into contact with gas (g) ascending through the tray and crossing the active mass transfer surface 20 through the orifices 18. Valves (not shown), namely either fixed valves or float valves, may be located above each orifice (18) in the tray deck (12), in order to extend turn-down, i.e. minimize liquid flow through orifices (18) at low vapor flow rates. The liquid (l) mixed with some of the gas (g) the flows into the annular channel 26, where it is collected on the bottom area 28 of the annular channel 26. Residual gas (g) bubbles out of the mixture, so that essentially exclusively liquid (l) enters the pipes 40 and is transferred into the central downcomer 34, where it is guided downwards and leaves the central downcomer 34 through its opening 36 provided in the bottom area of the central downcomer 34 and hits the surface of the central portion 14 of the tray deck 12 of the below tray (not shown in FIGS. 1A to 1C, but in FIG. 2A).

Figure 2C:
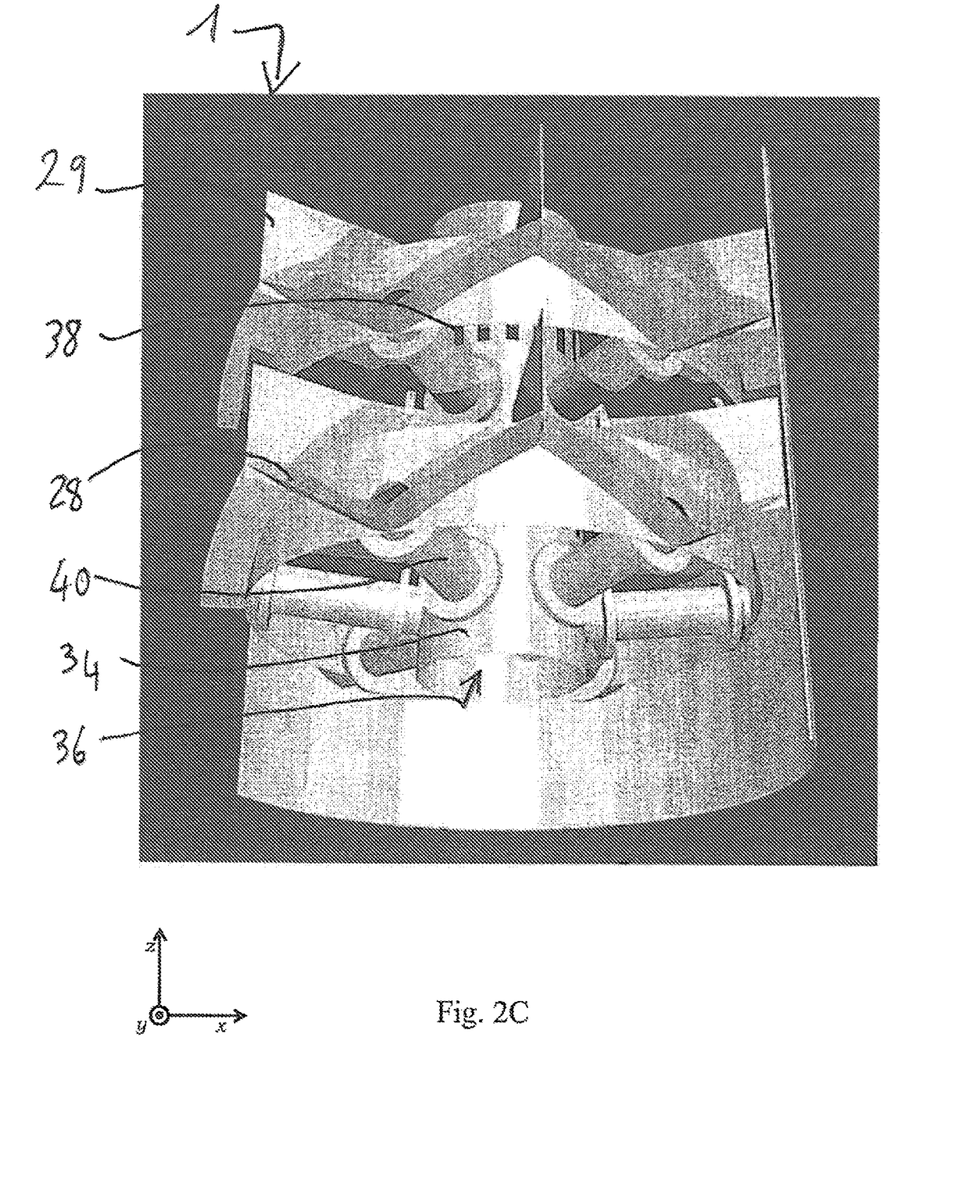

FIGS. 2A to 2C show a fractionation column 1 comprising three fluid contact trays according to the embodiment shown in FIGS. 1A to 1C, wherein the three fluid contact trays are arranged above each other.

The liquid flowpath during the operation of the fractionation column 1 is shown by the broken lines marked with (l) and arrows.

Figure 3:
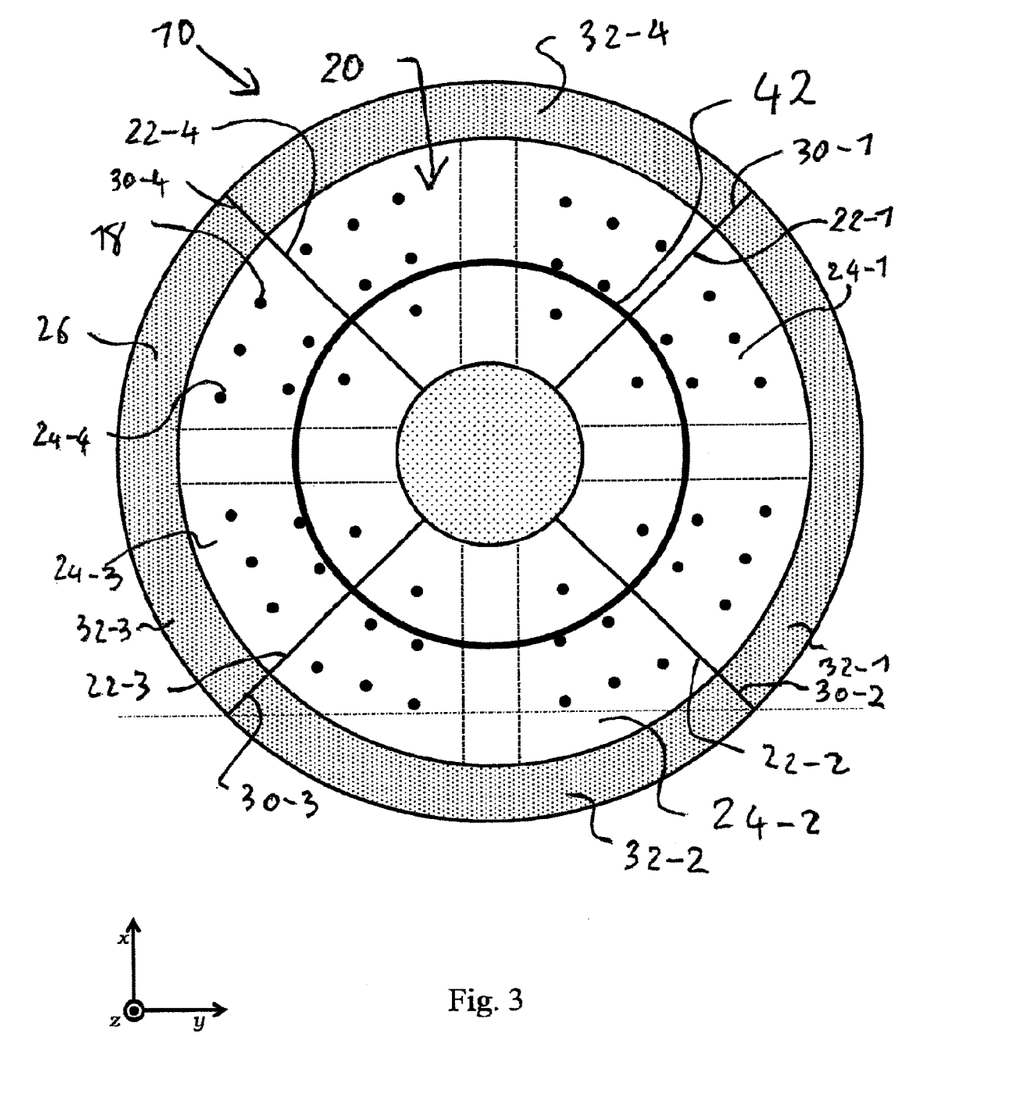
FIG. 3 is a sectional top view of the fluid contact tray of a fluid contact tray according to another embodiment of the present invention.

FIG. 3 shows a sectional top view of a fluid contact tray 10 according to another embodiment of the present invention. More specifically, the fluid contact tray 10 of this embodiment is identical to that described with regard to FIG. 1A to 1C except that the fluid contact tray 10 further comprises one circular separation weir 42, which is arranged at intermediate radius of the tray deck 10. The separation weir 42 of this embodiment is perforated and extends substantially vertical. The height of the separation weir 42 corresponds preferably to 20 to 60% of the tray spacing.

REFERENCE NUMERALS 1 fractionation column
10 fluid contact tray
12 tray deck
14 central portion of the tray deck
16 main portion of the tray deck
18 orifices 20 active mass transfer surface
22-1, 22-2, 22-3, 22-4 separation wall
24-1, 24-2, 24-3, 24-4 active mass transfer surface sections
26 annular channel
28 bottom area of annular channel
29 sidewall/housing
30-1, 30-2, 30-3, 30-4 partition wall
32-1, 32-2, 32-3, 32-4 annular channel sections
34 central downcomer
36 opening in the bottom area of the central downcomer
38 venting holes
40 conducting means/pipe
42 separation weir
A column axis/height axis
α inclination angle of active mass transfer surface with regard to the horizontal plane
β inclination angle of conducting means with regard to the horizontal plane
x, y, z spatial directions

The invention claimed is:

1. A fractionation column (1) comprising:
   a housing (29) and at least one fluid contact tray (10), wherein the fluid contact tray is a vapor-liquid contact tray and wherein the tray (10) comprises:
   a tray deck (12) comprising an active mass transfer surface (20) suitable for contacting a fluid (g) and a fluid (l), wherein fluid (l) has a higher density than fluid (g), wherein the active mass transfer surface (20) comprises one or more orifices (18) for the passage of & fluid (g), and wherein at least two at least partially radially extending separation walls (22-1, 22-2, 22-3, 22-4) and/or at least one separation weir (42) are arranged on the active mass transfer surface (20), which divides the active mass transfer surface (20) into at least two sections (24-1, 24-2, 24-3, 24-4),
   an annular channel (26) having a bottom area (28) suitable for collecting fluids (1), which is arranged at the peripheral area of the active mass transfer surface (20) and embraces or partially embraces the mass transfer surface (20),
   a central downcomer (34) for collecting and discharging fluid (l) from the annular channel (26), wherein the central downcomer (34) has the form of a hollow body with an opening (36) in the bottom section thereof being suitable for the distribution of liquid vertically downwardly, and wherein the central downcomer (34) is non-rotatably fixed at the fluid contact tray (10), and
   at least one conducting means (40) for transferring fluid collected in the annular channel (26) from the annular channel (26) to the central downcomer (34),
   wherein the fractionation column (1) comprises at least two fluid contact trays (10), which are arranged so as to allow the distribution of liquid vertically downwardly from the opening (36) of the downcomer (34) of one fluid contact tray (10) onto the upper side of the tray deck (12) of the adjacent fluid contact tray (10).

2. The column (1) according to claim 1, wherein the active mass transfer surface (20) has, in top view, the form of at least substantially a circular ring and wherein the fluid contact tray (10) is formed at least substantially symmetrically and wherein the tray deck (12) comprising the active mass transfer surface (20) and at least partially radially extending separation walls (22-1, 22-2, 22-3, 22-4) and/or separation weir (42) is substantially rotation-symmetrically with respect to the axis (A), which extends through the center of the tray perpendicular to the tray deck (12).

3. The column (1) according to claim 1, which is configured so that in operation liquid (1) flows on the active mass transfer surface (20) from its radially inner end to its peripheral area and that liquid (1) is transferred from the annular channel (26) to the central downcomer (34) located in the center of the fluid contact tray (10).

4. The column (1) according to claim 1, wherein between 2 and 8 at least partially radially extending separation walls (22-1, 22-2, 22-3, 22-4) are arranged on the active mass transfer surface (20), and/or, wherein between 1 and 8, separation weirs (42) are arranged on the active mass transfer surface (20).

5. The column (1) according to claim 1,
   wherein the at least two at least partially radially extending separation walls (22-1, 22-2, 22-3, 22-4) extend from the radially outer periphery line of the active mass transfer surface (20) over more than 50% to less than 100% of the distance between the peripheral line of the active mass transfer surface (20) and the center of the tray deck (12).

6. The column (1) according to claim 1, wherein at least one at least partially radially extending partition wall (30-1, 30-2, 30-3, 30-4) is arranged on the bottom area (28) and/or in the top area of the annular channel (26), wherein the at least one at least partially radially extending partition wall (30-1, 30-2, 30-3, 30-4) extends substantially in vertical direction.

7. The column (1) according to claim 6, wherein between 1 and 8 at least partially radially extending partition walls (30-1, 30-2, 30-3, 30-4) are arranged on the bottom area (28) and/or in the top area of the annular channel (26).

8. The column of claim 7, wherein the number of partition walls (30-1, 30-2, 30-3, 30-4) arranged on the bottom area (28) and/or in the top area of the annular channel (26) is equal to the number of the separation walls (22-1, 22-2, 22-3, 22-4) arranged on the active mass transfer surface (20).

9. The column (1) according to claim 6, wherein the tray (10) comprises at least two at least partially radially extending partition walls (30-1, 30-2, 30-3, 30-4), wherein the at least partially radially extending partition walls (30-1, 30-2, 30-3, 30-4) are arranged substantially equally spaced apart from each other on the bottom area (28) and/or in the top area of the annular channel (26), so that the annular channel (26) is divided by the partition walls (30-1, 30-2, 30-3, 30-4) into substantially equally sized sections (32-1, 32-2, 32-3, 32-4).

10. The column (1) according to claim 1, wherein the tray deck (12) is sloped downwardly, either from center of the tray deck (12) to the periphery of the active mass transfer surface (20) or from the radially inner end of the active mass transfer surface (20) to the periphery of the active mass transfer surface (20), with a negative angle (α) measured in radial direction with respect to the horizontal plane of 2 to 10°.

11. The column (1) according to claim 1, wherein the at least one conducting means (40) is a pipe, wherein one opening of the pipe (40) opens out into the lower part of the annular channel (26) and the other opening of the pipe (40) opens out into the central downcomer (34).

12. The column (1) according to claim 1, wherein at least one at least partially radially extending partition wall (30-1, 30-2, 30-3, 30-4) is arranged on the bottom area (28) of the annular channel (26) dividing the annular channel (26) in a number of sections (32-1, 32-2, 32-3, 32-4) corresponding to the number of the partition walls (30-1, 30-2, 30-3, 30-4), wherein the fluid contact tray (10) comprises equal or a greater number of conducting means (40) than the number of sections (32-1, 32-2, 32-3, 32-4).

13. The column (1) according to claim 1, wherein the column is an offshore fractionation column.

14. A method for use of a fractionation column (1) according to claim 1 comprising the steps of: providing the fractionation column (1) according to claim 1, introducing fluid mixtures to the housing of the fractionation column (1), and performing a thermal separation process to separate fluid mixtures into their components, wherein the fractionation column (1) is located offshore.

15. The method of use according to claim 14, wherein the thermal separation process comprises at least one of:
- high pressure distillation in the fractionation column (1), which is performed at a pressure of at least 6 bar,
- removal of a heavy fraction in the fractionation column (1) from a hydrocarbon mixture, and
- removal of light fractions in the fractionation column (1) from a hydrocarbon mixture.

* * * * *

UNITED STATES PATENT AND TRADEMARK OFFICE
CERTIFICATE OF CORRECTION

PATENT NO. : 10,434,438 B2  
APPLICATION NO. : 15/537811  
DATED : October 8, 2019  
INVENTOR(S) : Stephen Shields et al.

Page 1 of 1

It is certified that error appears in the above-identified patent and that said Letters Patent is hereby corrected as shown below:

In the Claims

Column 17, Claim 1, Line 31 should read:
...passage of fluid (g), and wherein at least two at...

Column 17, Claim 1, Line 39:
...suitable for collecting fluids(l), which is arranged at...

Signed and Sealed this
Twenty-sixth Day of November, 2019

Andrei Iancu
*Director of the United States Patent and Trademark Office*